United States Patent
Eaton et al.

(10) Patent No.: US 7,410,598 B2
(45) Date of Patent: *Aug. 12, 2008

(54) CHEMICAL BASE FOR FUEL CELL ENGINE HEAT EXCHANGE COOLANT/ANTIFREEZE

(75) Inventors: Edward Raynes Eaton, Phoenix, AZ (US); Wyndham Henry Boon, North Canton, OH (US); Christopher John Smith, Haslemere (GB)

(73) Assignee: Shell Oil Company, Houston, TX (US)

( * ) Notice: Subject to any disclaimer, the term of this patent is extended or adjusted under 35 U.S.C. 154(b) by 56 days.

This patent is subject to a terminal disclaimer.

(21) Appl. No.: 11/281,002

(22) Filed: Nov. 17, 2005

(65) Prior Publication Data

US 2006/0076533 A1 Apr. 13, 2006

Related U.S. Application Data

(62) Division of application No. 10/074,834, filed on Feb. 13, 2002.

(60) Provisional application No. 60/268,642, filed on Feb. 14, 2001.

(51) Int. Cl.
  *C09K 5/00* (2006.01)
  *H01M 8/18* (2006.01)

(52) U.S. Cl. ............... 252/71; 252/73; 252/75; 429/20; 429/26; 429/120

(58) Field of Classification Search ............... None
See application file for complete search history.

(56) References Cited

U.S. PATENT DOCUMENTS

| | | | |
|---|---|---|---|
| 2,434,110 A | 1/1948 | Hatch et al. | 260/602 |
| 2,725,359 A | 11/1955 | Harman et al. | 252/49.8 |
| 3,956,154 A | 5/1976 | Marolewski et al. | 252/78 |
| 4,332,870 A * | 6/1982 | Parsen et al. | 429/206 |
| 4,382,870 A | 5/1983 | Abel et al. | 252/75 |
| 4,426,309 A | 1/1984 | Abel et al. | 252/75 |
| 4,617,490 A | 10/1986 | Fitzpatrick et al. | 313/478 |

(Continued)

FOREIGN PATENT DOCUMENTS

JP 06026979 4/1994

(Continued)

OTHER PUBLICATIONS

"A Chemical Base for Engine Coolant/Antifreeze With Improved Thermal Stability Properties," by E. R. Eaton, W. H. Boon, and C. J. Smith, SAE Technical Paper Series 2001-01-1182, SAE 2001 World Congress, Detroit, Michigan, Mar. 5-8, 2001.

(Continued)

*Primary Examiner*—Necholus Ogden

(57) ABSTRACT

A nontoxic fuel cell engine coolant which has an electrical resistivity of greater than 250 kOhm-cm, a boiling point of greater than 90° C., a freezing point of less than −40° C., a thermal conductivity of greater than 0.4 W/m-k, a viscosity of less than 1 cPs at 80° C., a viscosity of less than 6 cPs at 0° C., a heat capacity of greater than 3 kJ/kg-K, and which is compatible with current cooling system materials.

5 Claims, 1 Drawing Sheet

Freeze Point Characteristics of 1,3-propanediol Compared to EG-Based Coolant (°C).

U.S. PATENT DOCUMENTS

| | | | |
|---|---|---|---|
| 4,657,689 A | 4/1987 | Darden | 252/75 |
| 4,925,603 A | 5/1990 | Nambu | 264/28 |
| 4,954,279 A | 9/1990 | Ma et al. | 252/70 |
| 5,015,789 A * | 5/1991 | Arntz et al. | 568/862 |
| 5,242,621 A | 9/1993 | Miller et al. | 252/396 |
| 5,269,956 A | 12/1993 | Miller et al. | 252/67 |
| 5,304,691 A | 4/1994 | Arhancet et al. | 568/867 |
| 5,366,651 A | 11/1994 | Maes et al. | 252/76 |
| 5,772,912 A * | 6/1998 | Lockyer et al. | 252/70 |
| 6,991,874 B1 * | 1/2006 | Mohwald et al. | 429/129 |

FOREIGN PATENT DOCUMENTS

| | | |
|---|---|---|
| JP | 9210514 | 8/1997 |
| JP | 10055812 | 2/1998 |
| JP | 11097045 | 4/1999 |
| JP | 11117766 | 4/1999 |
| WO | 00/33407 | 6/2000 |
| WO | WO02055759 | 7/2002 |

OTHER PUBLICATIONS

International Search Report of Aug. 1, 2002.

U.S. Appl. No. 10/074,834 (including office action).

U.S. Appl. No. 09/989,888 (including office action), filed Nov. 21, 2001.

* cited by examiner

Figure 1: Freeze Point Characteristics of 1,3-propanediol Compared to EG-Based Coolant (°C).
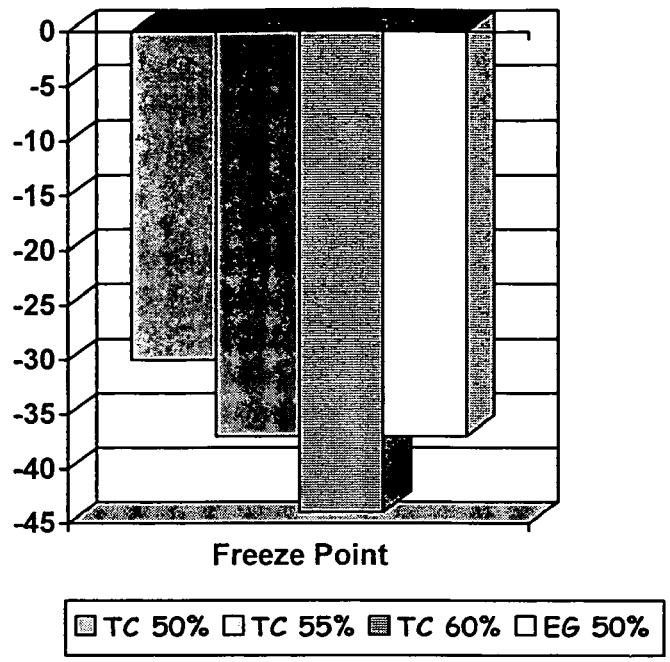
Figure 2
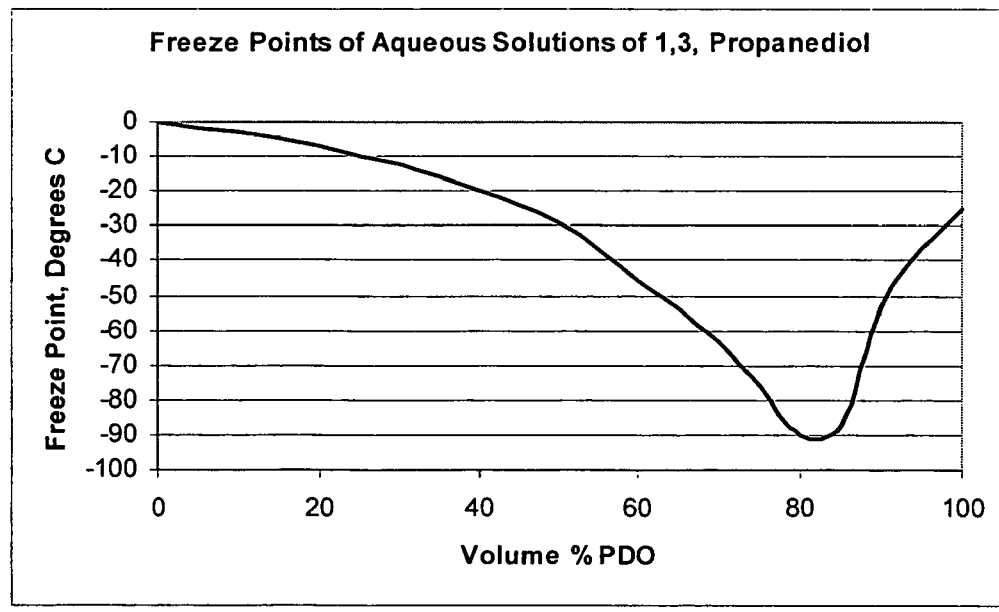

CHEMICAL BASE FOR FUEL CELL ENGINE HEAT EXCHANGE COOLANT/ANTIFREEZE

This application is a divisional of application 10/074,834 filed Feb. 13, 2002, which claims benefit to application 60/268,642, filed Feb. 14, 2001.

FIELD OF THE INVENTION

This invention relates to a novel technology for use in cooling systems for fuel cell powered vehicles and/or equipment. In order to remove the heat that is generated in fuel cell systems, 1,3-propane diol is used as the chemical base for the heat exchange fluid.

BACKGROUND OF THE INVENTION

It has been suggested that fuel cell technology can be used to generate electricity in sufficient volume to be applicable in the driving of electric motors for passenger vehicles, standby power generation, and other applications. A fuel cell is a device that converts chemical energy of a fuel directly into electricity and they are intrinsically more efficient than most other energy generation devices, such as internal combustion engines. In principle, a fuel cell operates somewhat like a battery. Unlike a battery, a fuel cell does not run down or require recharging. It will produce energy in the form of electricity and heat as long as fuel is supplied. The most common type of fuel cell consists of two electrodes sandwiched around an electrolyte. Oxygen passes over one electrode and hydrogen over the other, generating electricity, water, and heat.

The fact that heat is generated by the fuel cell requires the presence in the automobile or other system of a cooling system which can be similar to those used presently in internal combustion engines. Typically, such a system includes a circulating pump, plumbing that may include aluminum, brass, copper, lead-tin solder, stainless steel, plastic or rubber materials, and a heat exchanger (radiator) typically constructed of aluminum or copper/brass.

The heat exchange fluid (coolant) is obviously just as important in a fuel cell system as it is in internal combustion engines. Many of the requirements of a heat exchange fluid for internal combustion engines are also required for fuel cell engines. However, there are some additional requirements. For instance, fuel cell vehicles generate a direct current of 400 volts. The coolant, which flows around the aluminum components of the fuel cell, must be nonconductive to protect both the cell itself from shorting out and to prevent electrical hazard to humans operating or servicing the system.

The first fuel cell was built in 1839 by Sir William Grove, a Welsh judge and gentleman scientist. The "Grove cell" used a platinum electrode immersed in nitric acid and a zinc electrode in zinc sulfate to generate about 12 amps of current at about 1.8 volts. There were other developments in fuel cell technology over the years but serious interest in the fuel cell as a practical generator of electricity did not begin until the 1960's, when the U.S. Space Program chose fuel cell technology over nuclear power and solar energy. This technology, developed by Francis Thomas Bacon, used nickel gauze electrodes and operated under pressures as high as 300 psi.

SUMMARY OF THE INVENTION

A nontoxic fuel cell engine coolant which has an electrical resistivity of greater than 250 kOhm-cm, a boiling point of greater than 90° C., optionally, a freezing point of less than −40° C., a thermal conductivity of greater than 0.4 W/m-k, a viscosity of less than 1 cPs at 80° C., a viscosity of less than 6 cPs at 0° C., a heat capacity of greater than 3 kJ/kg-K, and which is compatible with current cooling system materials. The coolant may contain from 1 to 100, preferably 40 to 85 and most preferably 55 to 85, volume percent PDO and most or all of the remaining balance is water.

BRIEF DESCRIPTION OF THE DRAWINGS

FIG. 1 illustrates the aqueous solution freeze point characteristics of the 1,3-propanediol and GM 6043 inhibition chemistry (EG).

FIG. 2 is a plot of the freeze behavior of aqueous 1,3-propanediol antifreeze.

DETAILED DESCRIPTION OF THE INVENTION

As previously stated, the purpose of a fuel cell is to produce an electrical current that can be directed outside the cell to do work, such as powering an electric motor. Because of the way electricity behaves, this current returns to the fuel cell, completing an electrical circuit. The chemical reactions that produce this current are the key to how a fuel cell works. There are several kinds of fuel cells which operate somewhat differently but in general terms, hydrogen atoms enter a fuel cell at the anode where a chemical reaction strips them of their electrons. The hydrogen atoms are now "ionized" and carry a positive electrical charge. The negatively charged electrons provide the current through wires to do work.

Oxygen enters the fuel cell at the cathode and it there combines with electrons returning from the electrical circuit and hydrogen ions that have traveled through the electrolyte from the anode. In some fuel cells the oxygen picks up electrons and then travels through the electrolyte to the anode where it combines with hydrogen ions. This chemical reaction generates a significant amount of heat energy which must be removed from the fuel cell in order for it to continue to operate properly.

A number of objectives have been identified for coolants for fuel cell vehicles. First, since fuel cell vehicles generate a direct current of 400 volts, the coolant which flows around the aluminum components of the fuel cell must be nonconductive to protect the cell from shorting out and to prevent electrical hazards. Other physical property objectives for fuel cell coolants are set out in the table below:

TABLE 1

| | |
|---|---|
| Electrical Resistivity | >250 kOhm-cm |
| Boiling point | >90° C. |
| Freezing point | <−40° C. |
| Thermal Conductivity | >0.4 W/m-k |
| Viscosity | <1 cPs @ 80° C. < 6 cPs @ 0° C. |
| Heat Capacity | >3 kJ/kg-K |
| Durability | >5,000 hours of operation/3 years total time |
| Material compatibility: | Compatible with current cooling system materials |
| Toxicity | Classified as non-toxic for transportation |

1,3-propanediol (PDO), which is manufactured by Shell Chemical Company, is generally made as described in U.S. Pat. No. 5,304,691 and the art described therein. This is a process for making PDO and HPA (3-hydroxypropanal, a 3-hydroxyaldehyde). In this particular patent, PDO and HPA are made by intimately contacting an oxirane (ethylene oxide, hereinafter 'EO'), a ditertiary phosphine-modified cobalt carbonyl catalyst, a ruthenium catalyst promoter, and syngas (carbon monoxide and hydrogen) in an inert reaction solvent at hydroformylation reaction conditions. A PDO yield of up to 86-87 mole % is reported, using a catalyst comprising cobalt ligated with 1,2-bis(9-phosphabicyclononyl)ethane as bidentate ligand, and either triruthenium(0) dodecarbonyl or bis[ruthenium tricarbonyl dichloride] as cocatalyst. Other methods of making PDO are known.

Inhibited with the GM 6043 chemistry, the 1,3-propanediol performed somewhat better than EG in modified ASTM-type tests. FIG. 1 illustrates the aqueous solution freeze point characteristics of the 1,3-propanediol and GM 6043 (EG). There is a slight compromise of freeze protection as determined by the ASTM D1177 test method, but the 1,3-propanediol was soft and slushy at the reported freeze point. This could be an indication that actual protection against hard, damaging freezing is actually better, approaching the effective protection point of the EG-based product. We also performed the D1177 test with 55% and 60% 1,3-propanediol in water, and found that the 55% concentrated product offered protection equivalent to 50% EG, per the test method. Freeze protection continued to improve at 60% 1,3-propanediol. We feel that the antifreeze properties of the chemistry are acceptable. Indeed a 50% solution would provide adequate protection against freezing in most geographies. TC in FIG. 1 is an internal designation for the PDO aqueous solutions at 50, 55, and 60 volume percent PDO.

FIG. 2 shows the freeze behavior of PDO/water solutions. It can be seen that formulations may be made with freeze points significantly lower than −40° C.

It may be desirable to include an effective amount of an antifoaming composition in the antifreeze/coolant composition. Such components are well known. Polyglycol-type antifoaming agents can be used.

PDO coolants in fuel cell vehicles will have an electrical resistivity of greater than 250 kOhm-cm, a boiling point of greater than 90° C., usually a freezing point of less than −40° C., a thermal conductivity of greater than 0.4 W/m-k, a viscosity of less than 1 cPs at 80° C. and less than 6 cPs at 0° C., a heat capacity of greater than 3 kJ/kg-K, a desired durability of greater than 5000 hours of operation (three years total time), material compatibility—will not corrode or erode current automotive cooling system materials, have a toxicity classified as non-toxic for transportation, and will be cost competitive with current automotive coolants.

The PDO formulations give intrinsically better protection against cavitation than EG or PG.

It is our theory that some or all of these advantages are based upon the relative chelation ability of PDO versus EO and PO. The latter are readily able to chelate the ions. The chelate with EO and PO will be a five-membered ring which is relatively easy to form. PDO cannot chelate the ions as well because it forms a six-membered ring and this is more difficult.

EXAMPLES

Two chemistries were used in the following experiments. These are 1,3-propane diol (anhydrous) and 1,3-propane diol (50 to 85 percent volume percent aqueous solution).

Example 1

At the beginning, we believed that the classical corrosion and performance testing regimen as described in ASTM literature (2001 Annual Book of ASTM Standards, Volume 15.05) provides an accepted method to evaluate and compare the corrosive properties of coolants to the metals customarily used in vehicle coolant systems. The new variable for fuel cells is the 400 volt (Direct Current) electric field and the issues that such a field presents to the coolant. Ionic inhibitors are disqualified. The above coolants, running in the maximum resistance state with no inhibitors, were reviewed.

We believed that the following tests would accurately predict the above coolants' abilities to perform in a heat exchange system, in terms of corrosion protection, and physical and chemical properties. Since these new coolants had not been through this regimen of testing before, there was no experience or normal performance against which the tests could be compared for reasonableness. Therefore, each of the tests was controlled against 50 volume percent aqueous inhibited ethylene glycol.

The classical coolant development approach involves analyzing the fluid for physical and chemical properties. Once the properties are established, performance objectives are determined and the prototypes evaluated. These tests may be modified to better evaluate the performance of a coolant in its intended operating environment. Examples of modifications may include variations in the pressure, temperature, electric fuel environment, and duration of the tests. The data then will begin to serve to establish comparative and baseline data for the prototype new coolants. These tests will include fundamental properties, such as pH value and specific gravity, physical properties, and coolant-specific parameters including foaming tendency and reserve alkalinity. We believed that this data would direct the research towards the most appropriate coolants. The results are shown in Table 2.

TABLE 2

Physical and Chemical Properties

| Test Number & Description | Comparative Current Specification Value | Comments |
| --- | --- | --- |
| ASTM D-1122 Relative Density An experiment to determine the property of relative density. This information is used later in verifying the quality of commercialized products produced at blending facilities, and also has value to estimate contamination levels. | 1.110-1.145 | The relative density of the new coolant will be different than EG or PG and will also depend on the concentration of PDO and water. |

TABLE 2-continued

Physical and Chemical Properties

| Test Number & Description | Comparative Current Specification Value | Comments |
|---|---|---|
| ASTM D-1177 Freeze Point This experiment overcomes the soft 'slushy' freeze characteristic that makes determining the freezing point of some fluids difficult. It produces a graph of cooling behavior from which a consistent and meaningful freeze point can be determined. | <−40° C. | Choosing an appropriate solution can satisfy this requirement. |
| ASTM D-1120 Boiling Point This is a boiling point method consistent with standard methods used to determine the boiling points of most fluids. | >90° C. | The boiling point of the new coolant will be different than EG or PG and will also depend on the concentration of PDO and water |
| ASTM D-1882 Auto Finish The coolant is likely to be spilled on an auto finish. Therefore, it has always been a requirement that the coolant has no effect on the cars' finish, and this test was developed to evaluate that property. | no effect | No problem expected. |
| ASTM D-1119 Ash Content High levels of dissolved solids are associated with premature water pump wear and other durability issues. Completely evaporating the liquid and calculating the weight of the remaining dry material determines ash content. | <5.0% max. | Since this coolant will be very low in inhibitors, this specification may need to be further reduced to prevent conductivity problems. |
| ASTM D-1287 pH: The H+ ion concentration is reported as a pH value. This value is determined from an instrument reading. The pH value has to be appropriate for the inhibitor technology in use. | 7.5 to 11.0 | Experimentation will likely result in a tighter spec for PDO than is used today for EG and PG coolants. |
| ASTM D-1123 Water mass percent Water content on non-aqueous coolants is determined by the Karl Fischer method. | 5.0% max. | Applicable to the PDO before blending. |
| ASTM D-1121 Reserve Alkalinity In many inhibition technologies, the durability of the coolant is related to its ability to neutralize weak acids formed as the base and/or inhibitors degrade. This titration evaluates that property. | | This property may be obsolete, or may have QC value. |
| ASTM D-1881 Foaming Tendencies Foaming is an undesirable property associated with negative performance. This method creates a measurable volume, and also the time required to dissipate the foam. | Break: 5 sec. Volume: 150 ml | The new coolant should meet this requirement. |
| Electrical Conductivity mohs Test method: a calibrated laboratory bench conductivity meter is employed to measure the conductivity of the coolant. The conductivity probe is placed into the fluid, and the digital reading on the conductivity meter is observed. | <50 | Experimental data to be used in developing a test and performance specification. |
| Viscosity (cPs) ASTM D-445 | <1@80° C. <6@0° C. | Comparable to EG coolant. |

TABLE 2-continued

Physical and Chemical Properties

| Test Number & Description | Comparative Current Specification Value | Comments |
|---|---|---|
| Thermal Conductivity W/m-K from literature | >0.4 | Comparable to EG coolant. |
| Heat Capacity (kJ/kg-K) from literature | >3 | Comparable to EG coolant. |
| Durability by extended duration tests | >5 years | PDO promises excellent stability. |
| Effect on Elastomers: By Cummins Method 14292 Silicon Seals, Viton, Bunan (Nitrile), Teflon, Neoprene, Rubber, Nylon | <10% Δ Dimension Each | |
| Toxicity $LD_{50}$ data and review of MSDS | Non toxic for transportation | PDO offers low toxicity. |
| ASTM D2809 Water Pump Test, repeated three times | $\geq$8 each time | PDO has performed better than EG in the series of tests. See Table 3 below. |
| ASTM D-4340 Corrosion of Aluminum Heat Rejecting Surfaces | <1.0 $mg/cm^2$/week | PDO has performed at less than 10% of the allowed loss. |
| Extended aging evaluation in D-4340 Rig @ 150° C. for 60 Days sampled @ 10 day intervals. Aluminum weight loss Δ pH Oxidation products (i.e. COOH anions) Oxidation trend (slope of regression) | <1.0 $mg/cm^2$/week < 2 pH units <20% <2,000 ppm m < 1 | PDO degraded less in terms of pH value and in the formation of oxidation by-products in the presence of two fully formulated coolant inhibition packages. See Table 4 below. |
| ASTM D-1384 Corrosion in Glassware (Higher Performance Specification) | Maximum Weight Loss, mg | Test passed. |
| Copper | 5 | |
| Lead Solder | 10 | |
| Brass | 5 | |
| Steel | 5 | |
| Cast Iron | 5 | |
| Cast Aluminum | 10 | |
| Aged Coolant Corrosion (ASTM D-1384 extended) in Glassware @ 150° C. (Fluid from 2,000 Hour Aging) | Maximum Weight Loss, mg | |
| Copper | 10 | |
| Lead Solder | 30 | |
| Brass | 10 | |
| Steel | 10 | |
| Cast Iron | 10 | |
| Cast Aluminum | 30 | |
| Erosion Corrosion of Heat Exchanger, 2,000 hours | No leaks | |
| Repassivation of Aluminum by Galvanostatic Measurement ASTM D6208 | $E_B$ < 2.0 $E_G$ > −0.4.0 | |
| ASTM D-2570 Simulated Service (Higher Performance Specification) | Maximum Weight Loss, mg | Multiple embodiments passed. |
| Copper | 10 | |
| Lead Solder | 20 | |
| Brass | 10 | |
| Steel | 10 | |
| Cast Iron | 10 | |
| Cast Aluminum | 20 | |

TABLE 3

ASTM 2809 Test Data

| Inhibitor | EG | PDO |
| --- | --- | --- |
| Conventional Automotive | 8 | 9 |
| Carboxylate Automotive | 2 | 8 |
| Phosphated Heavy Duty | 10 | 10 |
| Non Phosphated Heavy Duty | 3 | 8 |
| Hybrid Heavy Duty | 9 | 10 |

TABLE 4

Oxidation comparison between PDO and EG inhibited with commercial inhibitor package @ 2.2%. Test run on D-4340 at 150° C., without corrosive water and at 50% concentration.

| | Time (days) | | | | | | |
| --- | --- | --- | --- | --- | --- | --- | --- |
| | 0 | 10 | 20 | 30 | 40 | 50 | 60 |
| pH | | | | | | | |
| PDO-A | 11.16 | 9.31 | 8.87 | 8.69 | 8.41 | 8.19 | 7.96 |
| EG-A | 10.06 | 7.67 | 6.38 | 5.68 | 4.60 | 4.31 | 4.07 |
| PDO-B | 10.58 | 9.63 | 8.89 | 8.56 | 8.32 | 8.18 | 7.93 |
| EG-B | 10.67 | 9.22 | 8.67 | 8.32 | 8.02 | 7.92 | 7.74 |
| Total Degradation Acids (ppm) | | | | | | | |
| PDO-A | 0 | 213 | 415 | 607 | 762 | 851 | 1029 |
| EG-A | 0 | 542 | 1553 | 1987 | 3498 | 4028 | 4705 |
| PDO-B | 0 | 231 | 372 | 587 | 688 | 833 | 1053 |
| EG-B | 0 | 342 | 654 | 922 | 1128 | 1486 | 1602 |

Example 2

In these experiments, a solution of 50 percent by volume 1,3-propane diol (PDO) and 50 percent by volume deionized water were tested for corrosion of various metals used in engine cooling systems over a period of time. The test method was modified from ASTM test method D-2570 by using the spaced interval examination procedure detailed in ASTM G-31. The following Table 5 shows the results:

TABLE 5

Extended Spaced Interval Simulated Service Test
Modified from ASTM D2570 (using ASTM G31 spaced interval)
Test Method
PDO @ 50% in DI Water
190° F. (88° C.). Spaced Interval Corrosion Data

| | Weeks | | | | |
| --- | --- | --- | --- | --- | --- |
| | 2 | 4 | 6 | 8 | 10 |
| Copper | 2 | 2 | 1 | 1 | 2 |
| Lead Solder | 3 | 2 | 6 | 6 | 3 |
| Brass | 2 | 2 | 3 | 3 | 4 |
| Steel | 11 | 12 | 13 | 13 | 13 |
| Cast Iron | 13 | 10 | 11 | 11 | 40 |
| Cast Aluminum | 22 | 34 | 40 | 40 | 40 |

Note how the corrosion behaves after 8-10 weeks. The fact that the aluminum corrosion does not increase after 6 weeks gives an indication that there is some flash corrosion initially but after that the oxides protect the aluminum. Generally, the absolute limit is specified by ASTM D3306 to be 60 mg of aluminum lost after 7 weeks' exposure.

Example 3

The next experiment was corrosion of aluminum services over an extended period of time. The results are set out in Table 6 below.

TABLE 6

Corrosion of Heat Rejecting Aluminum Surface
Modified from ASTM D4340
Temperature elevated to 300° F. (149° C.), Time extended from
1 week to 30 days
50% PDO 50% (volume) DI Water

| | Before Test | 10 Days | 20 Days | 30 Days |
| --- | --- | --- | --- | --- |
| Weight loss mg/cm²/week | — | 0.0 | 0.0 | 0.0 |
| pH | 6.55 | 5.34 | 4.60 | 4.99 |
| Conductivity μmhos/cm | 0 | 9 | 9 | 14 |
| Comments | No damage to specimen | No damage to specimen | No damage to specimen | No damage to specimen |

Please note that even after running this test for 30 days, there was no apparent corrosion damage to the specimen.

Example 4

This example describes experiments following the ASTM D1384 test method, modified by omitting the corrosive salts and were also made to operate at 150 degrees C. by changing the bath from water to 50% propylene glycol. The tests were done to test the corrosivity of solutions of PDO in water having amounts of PDO from 55 to 85 percent by weight. We have identified the 65 weight percent PDO solution as being the best because it offered the best overall protection for the six metals tested. However, the data in Table 7 also shows that solutions containing 55% and 60% PDO in water also achieved very good results because fuel cell systems are most likely to be manufactured primarily of aluminum and stainless steel.

TABLE 7

|  | Percent PDO in water | | | | | | |
|---|---|---|---|---|---|---|---|
|  | 55 | 60 | 65 | 70 | 75 | 80 | 85 |
| Copper | 1.2 | 2.0 | 1.6 | 1.7 | 1.7 | 1.6 | 0.6 |
| Lead Solder | 123.8 | 93.5 | 62.5 | 60.3 | 39.2 | 63.7 | 20.3 |
| Brass | 2.1 | 1.7 | 1.8 | 2.0 | 1.7 | 2.7 | 1.2 |
| Steel | 126.1 | 86.8 | 84.6 | 15.8 | 29.2 | 26.3 | 1.5 |
| Cast Iron | 247.6 | 186.6 | 263 | 255.3 | 227.1 | 189.3 | −0.7 |
| Cast Aluminum | 8.2 | 7.0 | 7.3 | 16.6 | 17.3 | 47.5 | 26.5 |
| Conductivity Before Test μmhos/cm | 0 | 0 | 0 | 0 | 0 | 0 | 0 |
| Conductivity After Test μmhos/cm | 30 | 22 | 10 | 7 | 4 | 3 | 0 |

SUMMARY OF RESULTS

We believe that the results show that these PDO-based coolants can be used for a low conductivity application in fuel cell powered systems, including fuel cell vehicles. PDO is demonstrated to be non-conductive and manifests corrosion resistant properties to the point of meriting serious consideration. The following are some of the more significant findings:

A coolant with high electrical resistance (low conductivity) has been developed that is appropriate for use in fuel cell powered systems, including fuel cell powered vehicles, that generate strong electrical fields. It has electrical resistivity of more than 250 kohm-cm. Ethylene glycol is too corrosive to be completely nonconductive.

The coolant, containing PDO, can be formulated in various concentrations to achieve freeze points of −40 (° F. or ° C.) or lower (see freeze point graphs in FIGS. 1 and 2).

The coolant offers more favorable boiling points in aqueous solutions than traditional glycol based coolants, as high as 471° F. (234° C.).

The thermal conductivity is comparable to glycol-based coolants (in water).

The viscosity is comparable to glycol-based coolants (in water).

The heat capacity is comparable to glycol-based coolants (in water).

The durability is better than glycol based coolants, offering the prospect of a closed, lifetime-filled low or no maintenance coolant system.

The coolant is compatible with system materials, including aluminum and elastomers.

The coolant is less toxic and less palatable than ethylene glycol and is much less likely to be involved in pet or child poisonings.

The cost of the coolant over the life of the system is comparable to existing premium coolants.

The physical property data for PDO and potentially competing coolants, ethylene glycol (EG) and propylene glycol (PG) are shown in Table 8:

TABLE 8

| Physical Properties | PDO | EG | PG |
|---|---|---|---|
| Mol. Wt. | 76.1 | 62.07 | 76.1 |
| Boiling Point, ° F. (° C.) | 417.9 | 387.7 | 369.3 |
|  | (214.4) | (197.6) | (187.4) |
| Flash Point, ° F. (° C.) | 265 | 240 | 220 |
|  | (129) | (116) | (104) |
| Specific Gravity, 20° C. | 1.0526 | 1.115 | 1.032 |
| Freeze Point, 50% solution, ° F. (° C.) | −21 | −36 | −28 |
|  | (−29) | (−38) | (−33) |
| Pour Point, ° F. (° C.) |  | <−75 | <−71 |
|  |  | (<−59) | (<−57) |
| Viscosity, cP 20° C. | 52 | 17 | 49 |
| Specific Heat, 212° F. BTU/lb/F [kJ/(kg*K)] | 0.652 | 0.665 | 0.704 |
|  | (2.730) | (2.784) | (2.948) |
| Thermal Conductivity, 25° C. BTU/hr-ft-F[W/(m*K) @ 25° C.] | 0.127 | 0.147 | 0.119 |
|  | (0.220) | (0.254) | (0.206) |
| Heat of Vaporization 25° C., BTU/lb [kJ/kg @ 25° C.] | 410 | 449 | 379 |
|  | (954) | (1044) | (882) |
| Purity | 99.7 | 94.5 | 99 |

We claim:

1. A method for cooling a fuel cell engine, comprising cooling a fuel cell engine with a coolant comprising 1,3-propanediol.

2. The method of claim 1 wherein said coolant is an aqueous solution comprised of between 1% to 100% by volume of 1,3-propanediol.

3. The method of claim 2 wherein the solution is comprised of from 40% to 85% by volume of 1,3-propanediol.

4. The method of claim 1 wherein the coolant has a freezing point of less than −40° C.

5. The method of claim 1 wherein the coolant has an electrical resistivity of greater than 250 Kohm-cm.

* * * * *